Dec. 14, 1948.  H. A. BALKE  2,455,970
CENTER BEARING
Filed Aug. 23, 1944  3 Sheets-Sheet 1

INVENTOR
HARRY A. BALKE
BY John E. Jackson
ATTORNEY

Dec. 14, 1948.  H. A. BALKE  2,455,970
CENTER BEARING
Filed Aug. 23, 1944  3 Sheets-Sheet 2

INVENTOR
HARRY A. BALKE
BY John E. Jackson
ATTORNEY

Dec. 14, 1948.  H. A. BALKE  2,455,970
CENTER BEARING
Filed Aug. 23, 1944  3 Sheets-Sheet 3

INVENTOR
HARRY A. BALKE
BY
John E. Jackson
ATTORNEY

Patented Dec. 14, 1948

2,455,970

UNITED STATES PATENT OFFICE 2,455,970

CENTER BEARING

Harry A. Balke, Valencia, Pa., assignor to American Bridge Company, a corporation of New Jersey Application August 23, 1944, Serial No. 550,781

3 Claims. (Cl. 308—137).

This invention relates to center bearings for use under various classes of rotatable structures such as railroad turntables, drawbridges, and similar heavy duty apparatus required to rotate about an upright or substantially vertical axis.

Among the objects of my invention are the following:

To provide a center bearing of improved design and arrangement having novel means whereby the superimposed load sustained by the bearing is concentrated on a relatively small area and then redistributed to larger areas through the various component parts of the bearing, so that great strength and rigidity are obtained in a bearing of minimum height;

To provide a center bearing with annular friction discs so constructed, arranged and mounted that they can be easily removed when worn because of long, heavy-duty service;

To provide for axial rotation of the moving parts within a flange around the outer edge of an upper friction disc to afford ample area effective to resist horizontal forces having a tendency to disengage the upper and lower portions of the center bearing structure;

To provide articulation of the saddle or top cap with reference to the upper distributing plate, so as to permit free deflection of the turntable girders under normal operating loads, without an accompanying disturbance or shifting of the center of pressure;

To provide for the free deflection of turntable girders with adequate means of lubrication of the parts to prevent excessive wear;

To provide means preventing the entrance of dirt and similar foreign matter which have a tendency to wear, corrode, or otherwise render the bearing parts inoperative;

To provide means effective to lubricate the horizontal and vertical surfaces of load-carrying antifriction discs;

To provide means forming an oil seal, permitting oil to be supplied under normal pressure to insure an adequate flow of lubricant to all coacting bearing surfaces;

To provide a center bearing structure in which the parts individually and collectively perform the advantageous functions hereinafter referred to, and To provide a center bearing having the novel construction and combination of coacting parts herein shown, described, and claimed.

For a complete disclosure of the invention, reference should be made to the following detailed description and the accompanying drawings.

Figure 1:
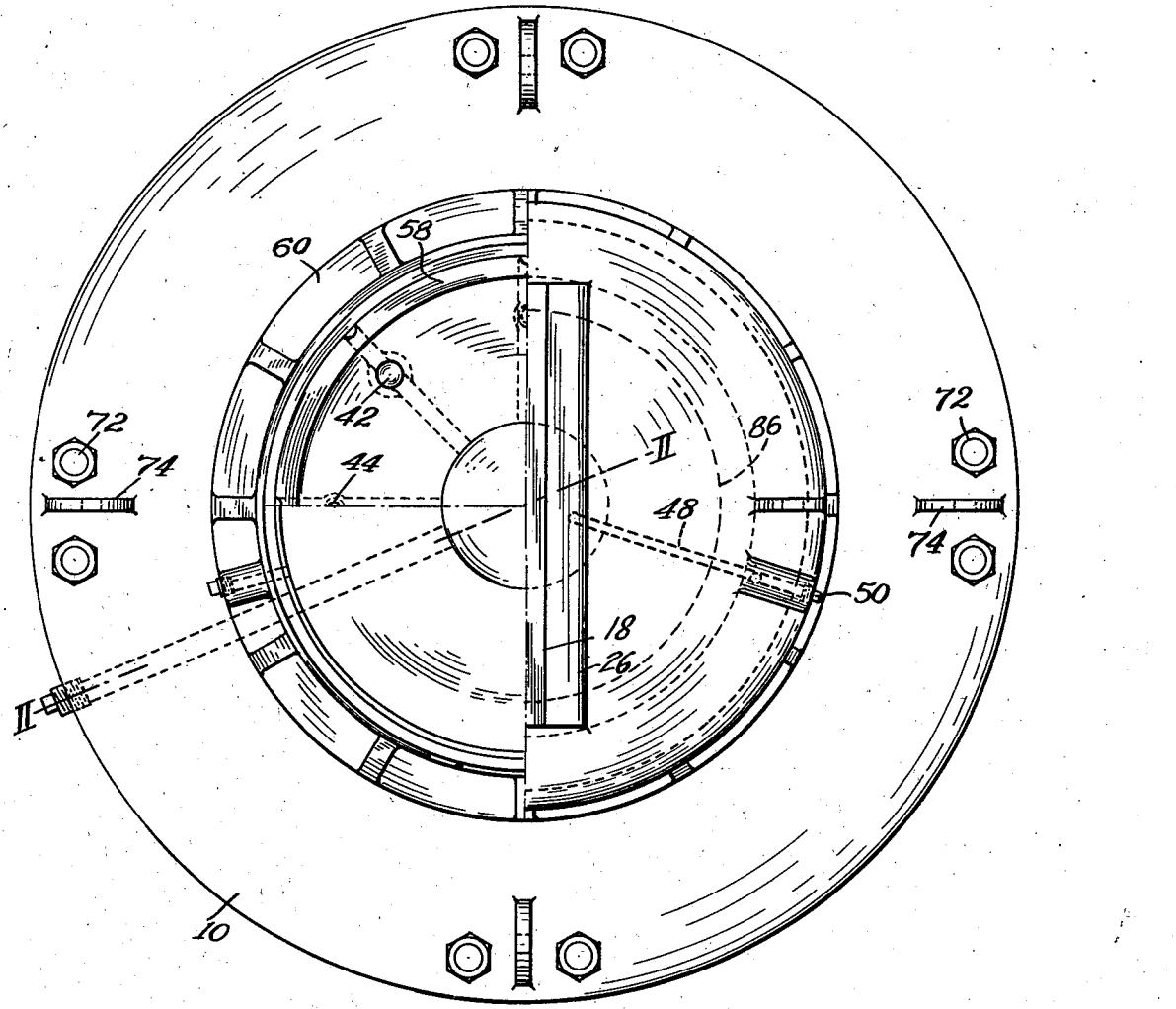
Figure 1 is a plan of a center bearing illustrating an embodiment of the herein claimed invention with the upper distributing plate broken out in the upper left-hand quadrant of the figure, the antifriction discs omitted in the lower left-hand quadrant, and the upper saddle or cap plate omitted in the right half of the figure.
Figure 2:
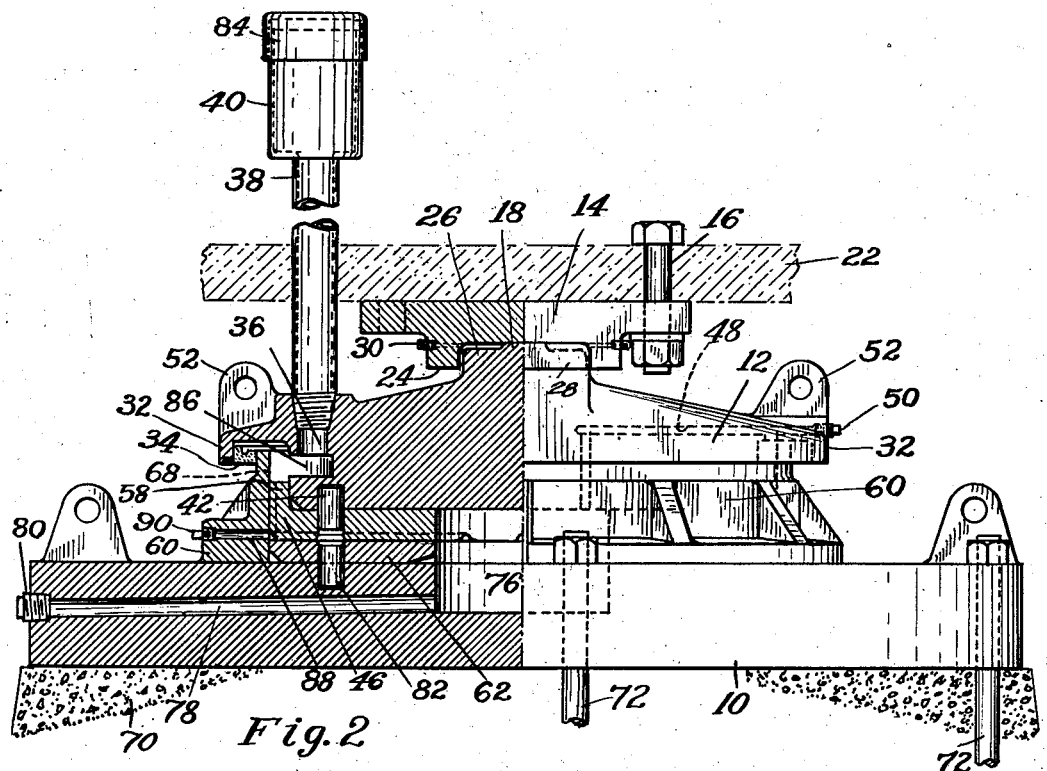
Figure 2 is a sectional elevation taken on line II—II of Figure 1 for the left half of the figure, the right half being in side elevation.
Figure 3:
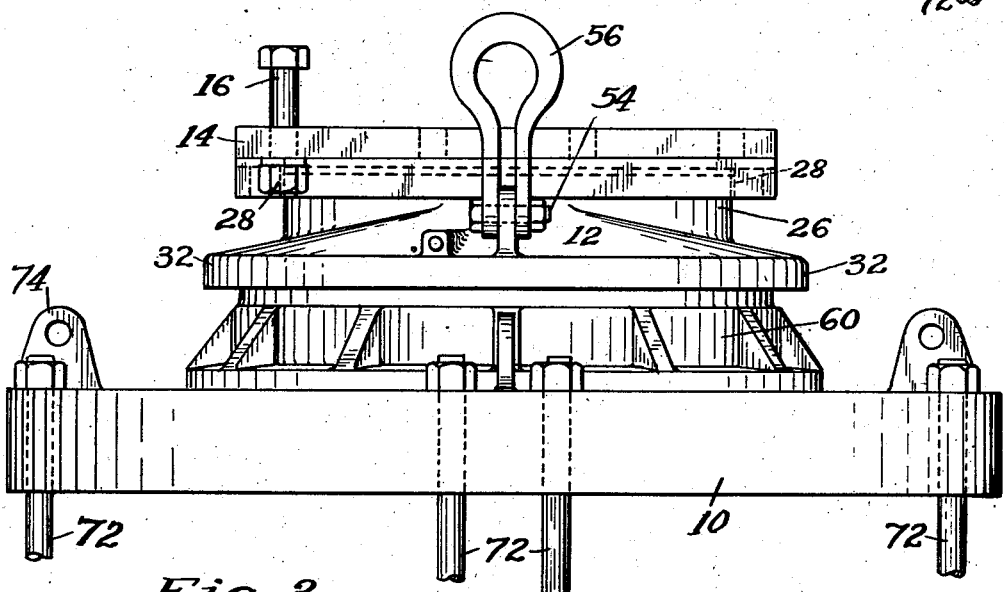
Figure 3 is a side elevation of the complete bearing as viewed from the right-hand side of Figure 1.

Referring in detail to the embodiment of the invention illustrated, numeral 10 designates a lower distributing plate and 12 an upper distributing plate. A saddle or cap plate 14, best shown in Figures 2 and 3, is mounted on the upper distributing plate. This saddle is adapted to be attached to turntable structural members by suitable bolts 16 and has a substantially flat lower surface. The saddle or cap plate transmits the vertical load in a concentrated small area directly to a raised rib 18 formed on a flat-topped boss 26 constituting the upper extremity of the upper distributing plate 12. The rib is flat on top for firm bearing engagement by the saddle. Longitudinal forces delivered to the saddle 14 by said bolts 16 attaching it to the turntable structure 22, are transmitted to the upper distributing plate 12 by shoulders 24 which coact with the boss 26 formed thereon, and transverse forces are similarly transmitted by shoulders 28 to said upper distributing plate 12. The shoulders 24 and 28, as shown, project downwardly from the under-side of the saddle or cap plate 14, and completely surround the boss 26 formed on the distributing plate 12, thus providing for the retention of heavy lubricants which are adapted to be introduced in a conventional manner by the use of a known type of grease gun having a joint or coupling portion adapted for engagement with a conventional grease fitting 30. Complete filling of the space between the under-side of the saddle and boss 26 on the upper distributing plate provides effective lubrication for the bearing, and satisfactorily excludes dirt or other foreign matter which might tend to unduly wear or corrode the parts.

The upper distributing plate 12, as shown in the drawings, is preferably circular in plan, and is formed with a flange 32 which completely extends around its periphery and is adapted to back up and support an oil seal ring 34. The upper distributing plate 12 is provided with an oil port 36 which is in communication with an oil supply pipe 38 extending vertically to a reservoir or tank 40 located approximately at the deck level of the turntable structure.

Dowels 42 and screws 44 serve to detachably secure an upper antifriction bearing disc 46 to the lower portion of the upper distributing plate 12. The upper distributing plate has an air vent 48 formed therein which is adapted to be closed by a removable plug 50 screwed into the peripheral face of said upper distributing plate. Lifting lugs 52 are formed integrally on the upper distributing plate, and have holes drilled therethrough to receive bolts 54 carried by lifting yokes 56 adapted to be engaged by suitable crane hooks or other conventional forms of overhead lifting tackle to facilitate initial installation and occasional dismantling of the parts when renewal or repair becomes necessary because of wear after long continued use. An integral peripheral or marginal flange 58 is formed on the upper antifriction disc 46 and bears around its entire periphery against a positioning ring 60 which is welded or otherwise securely anchored to the base or lower distributing plate 10.

The described construction and arrangement provides for the transfer of the entire vertical load, which is uniformly distributed over the surface of the antifriction disc 46 by the upper distributing plate 12 to the bearing face of a lower antifriction bearing disc 62 and in turn to the distributing plate or base 10 with uniform intensity of pressure.

Figure 4:
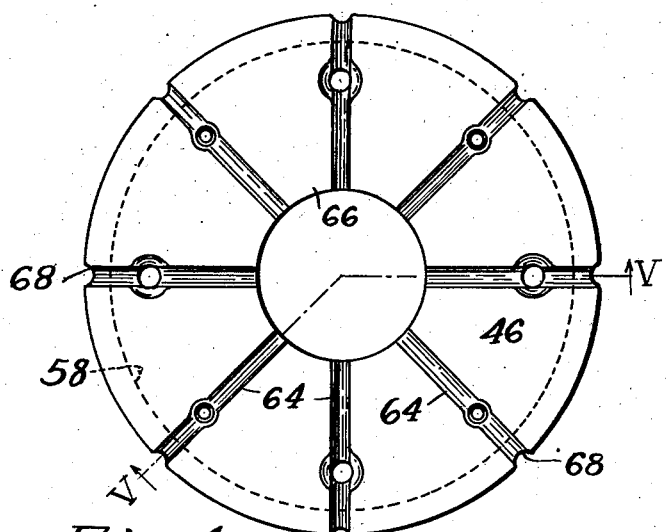
Figure 4 is an inverted or bottom plan of the upper antifriction disc.
Figure 5:
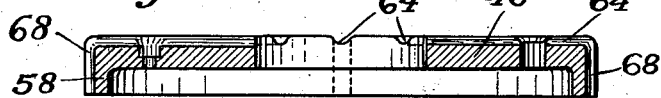
Figure 5 is a sectional elevation of the upper antifriction disc taken on line V—V of Figure 4.
Figure 6:
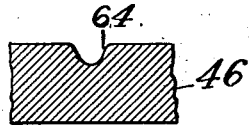
Figure 6 is an enlarged fragmentary detail section of the upper disc illustrating one of the oil distribution grooves thereof.

As best shown in Figure 4, the upper antifriction disc 46 is provided on its bottom face with a plurality of radial grooves 64 which extend from an oil chamber 66 at the central part of the disc across its bottom face and vertically upward, as at 68, for the full depth of the annular flange 58 at the periphery of the disc. Thus lubricant is effectively distributed to both the horizontal and vertical coacting bearing surfaces of the assemblage.

The described construction also provides for the transfer through flange 58 to positioning ring 60 and in turn to the lower distributing plate or base 10 of all longitudinal and transverse forces delivered to the upper distributing plate 12 by the saddle. These forces are then transferred to a suitable foundation 70, to which the base or lower distributing plate is securely attached by means of suitable anchor bolts 72. The lower distributing plate or base is provided with lifting lugs 74 to facilitate original installation or removal when repair is necessary. At its central region there is formed a chamber or well 76 serving as an oil sump. An oil drain 78 extends from the sump outwardly and it is closed by a removable screw plug 80. The chamber 66 is a continuation of chamber 76. Dowel pins 82 are placed in registering holes in the lower antifriction disc 62 and in the lower distributing plate or base 10, and disc 62 engages the inner peripheral face of the ring 60, thus centering the disc. The revolving portion of the bearing, as shown and described, is so constructed and arranged that all horizontally acting forces are transferred to the lower distributing plate or base 10.

The pipe 38 above referred to, which connects with the oil reservoir 40, has a cap 84 screwed or otherwise detachably secured to the top thereof.

By removing the cap 84 from the reservoir and opening the vent 48 by removal of plug 50, the bearing structure is completely and effectively vented, thus facilitating the complete filling of the bearing up to the level of the vent 48. Replacement of the plug 50 then permits filling of the oil pipe up to the deck level of the structure, whereupon cap 84 on the reservoir is replaced. As thus arranged, it will be observed that the oil in the bearing is under slight pressure, the magnitude depending upon the elevation of the reservoir 40 with respect to the coacting bearing surfaces. Such an arrangement provides an oil sealing film which is effectively forced against the positioning ring 60 by the hydrostatic head. This is desirable since it effectively seals the oil in and tends to force all dirt or other foreign substances out. A considerable hydrostatic head is provided above the rotating surfaces between the discs 46 and 62 by the oil in the annular space 86, thus providing for a steady supply of oil under pressure to all oil grooves, the reservoir 40 of course providing a continuous gravity pressure supply to the pipe 38. The lower portion of the chamber 76 provides a sump of ample volume for collection of any sludge, sediment, or other foreign material which may unintentionally be introduced into the bearing structure along with the oil intermittently charged to the reservoir 40 during the normal lubricating of the bearing by a maintenance crew. The positioning ring 60 is provided with one or more clean-out holes 88 normally closed by plugs 90 which are adapted to be occasionally removed to permit the insertion of a wire for cleaning or inspecting the oil grooves. Similarly, removal of screw plug 80 in drain-hole 78 permits the complete and effective draining and flushing of all parts of the center bearing without lifting the structure and dismantling any major parts thereof.

Figure 7:
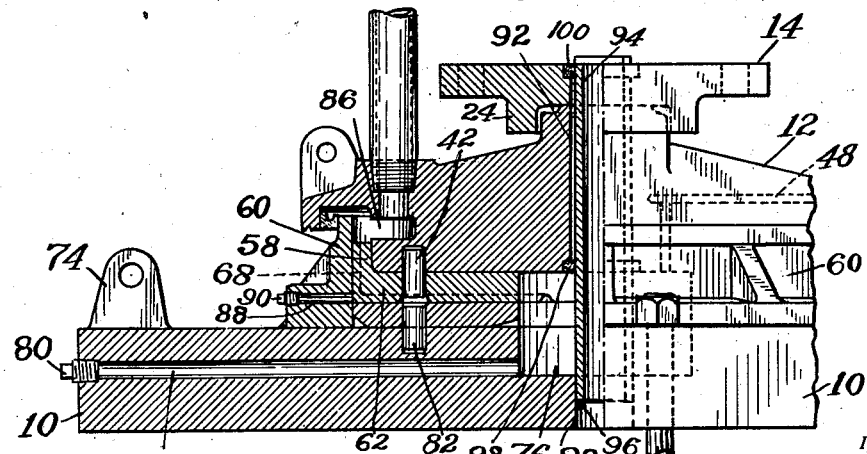
Figure 7 is a sectional elevation similar to Figure 2 showing a modification providing for the passage of air pipes or electrical conductors up through the axial region of the bearing without interference with the rotating parts thereof.

Figure 7 illustrates a center bearing structure which in all essential parts is substantially identical with that shown in Figures 1 to 6 inclusive, and wherein the parts are correspondingly identified. The construction of Figure 7 differs from that shown in the other figures only in that means are provided to permit electrical conductors, air pipes or the like, to be brought up through the fixed distributing plate or base 10 and through the revolving distributing plate 12 and cap plate 14 to the revolving structure 16. The modification of the structure of Figures 1 to 5 inclusive, necessary to permit installation of conductors, piping, etc., involves the provision of an axial hole 92 extending through the parts 10, 12 and 14, the addition of a central pipe 94 secured to the base 10 by a threaded connection or welded joint 96, the provision of an oil sealing ring 98 seated in a suitable recess formed in the under-face of the distributing plate 12 to prevent oil pressure within the center from leaking upward around the pipe 94, and the provision of an oil seal ring 100 in a suitable cavity formed in the upper face of the cap or saddle 14 to prevent the entrance of water and foreign material into the central region of the bearing and leakage of grease inside the saddle depression While I have described with particularity highly desirable features of structure and arrangement, it is to be understood that the drawings and description are to be interpreted in an illustrative rather than a limiting sense, since various modifications and substitutions of equivalents may be made by those skilled in the art without departure from the spirit and scope of the invention as defined in the appended claims.

I claim:

1. In a center bearing including a base, an annular flange upstanding from said base forming a centering ring, a stationary bearing disc seated within said ring, a second bearing disc within said ring resting on the stationary disc for rotary movement thereon, said second disc having a peripheral surface slidably engaging said flange as a radial bearing, and a circular load-distributing member resting on said second disc, the improvement comprising a substantially flat-topped elongated boss extending diametrically across the top of said member, said boss having a flat raised rib extending longitudinally thereof, and a saddle resting on said boss, said saddle having a flat bottom surface which engages said rib and shoulders depending therefrom adjacent the sides and ends of said boss.

2. The apparatus defined by claim 1 characterized by a well in said base, said discs, distributing member and saddle having aligned openings therethrough communicating with said well and a center pipe extending upwardly from the base through said well and said openings.

3. The apparatus defined by claim 2 characterized by a sealing ring on the bottom of said distributing member having wiping engagement with said pipe.

HARRY A. BALKE.

REFERENCES CITED

The following references are of record in the file of this patent:

UNITED STATES PATENTS

| Number | Name | Date |
|---|---|---|
| 1,486,142 | Hovey | Mar. 11, 1924 |
| 2,154,799 | Young, Jr. | Apr. 18, 1939 |